July 1, 1958

L. O. NICHOLS ET AL 2,841,116

FEEDING DEVICE

Filed March 8, 1955

INVENTORS.
LEWIS O. NICHOLS
HOWARD A. WILHELM

BY *Rudolph L. Lowell*

ATTORNEY.

July 1, 1958 L. O. NICHOLS ET AL 2,841,116
FEEDING DEVICE
Filed March 8, 1955 3 Sheets-Sheet 2
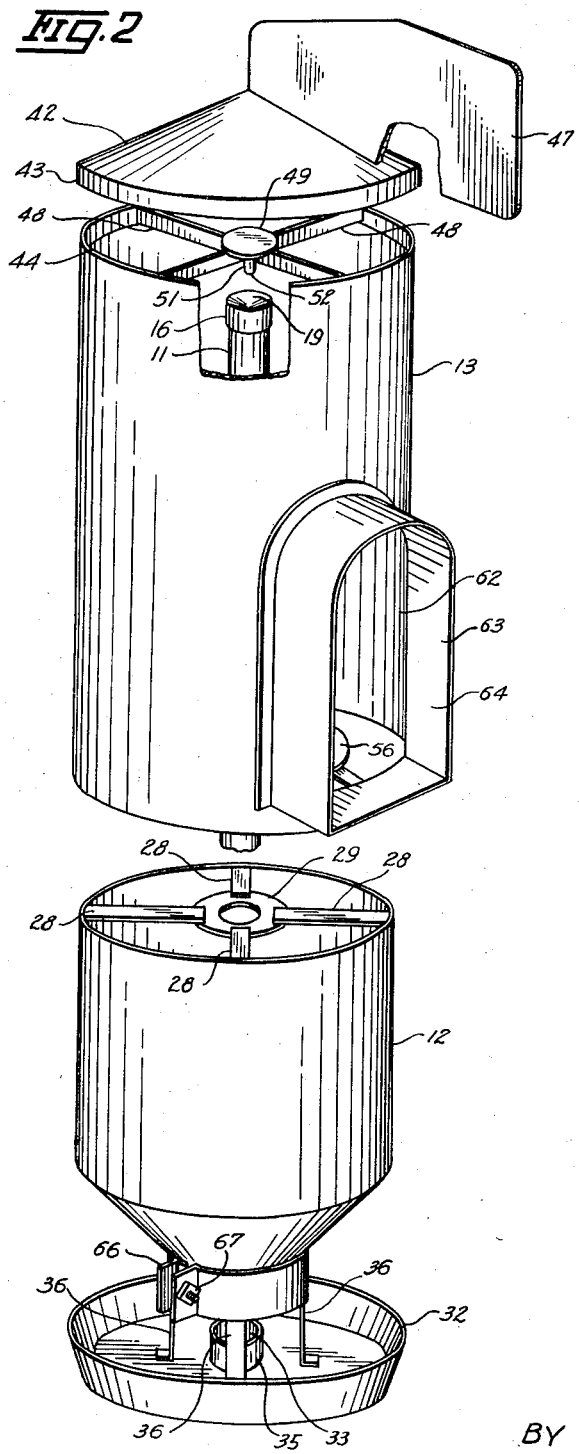
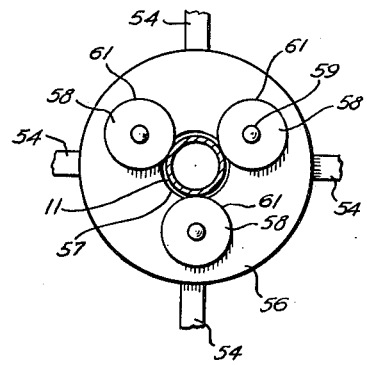
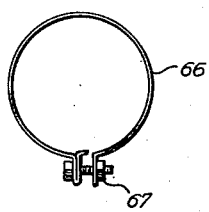
INVENTORS.
LEWIS O. NICHOLS
HOWARD A. WILHELM
BY *Rudolph L. Lowell*
ATTORNEY.

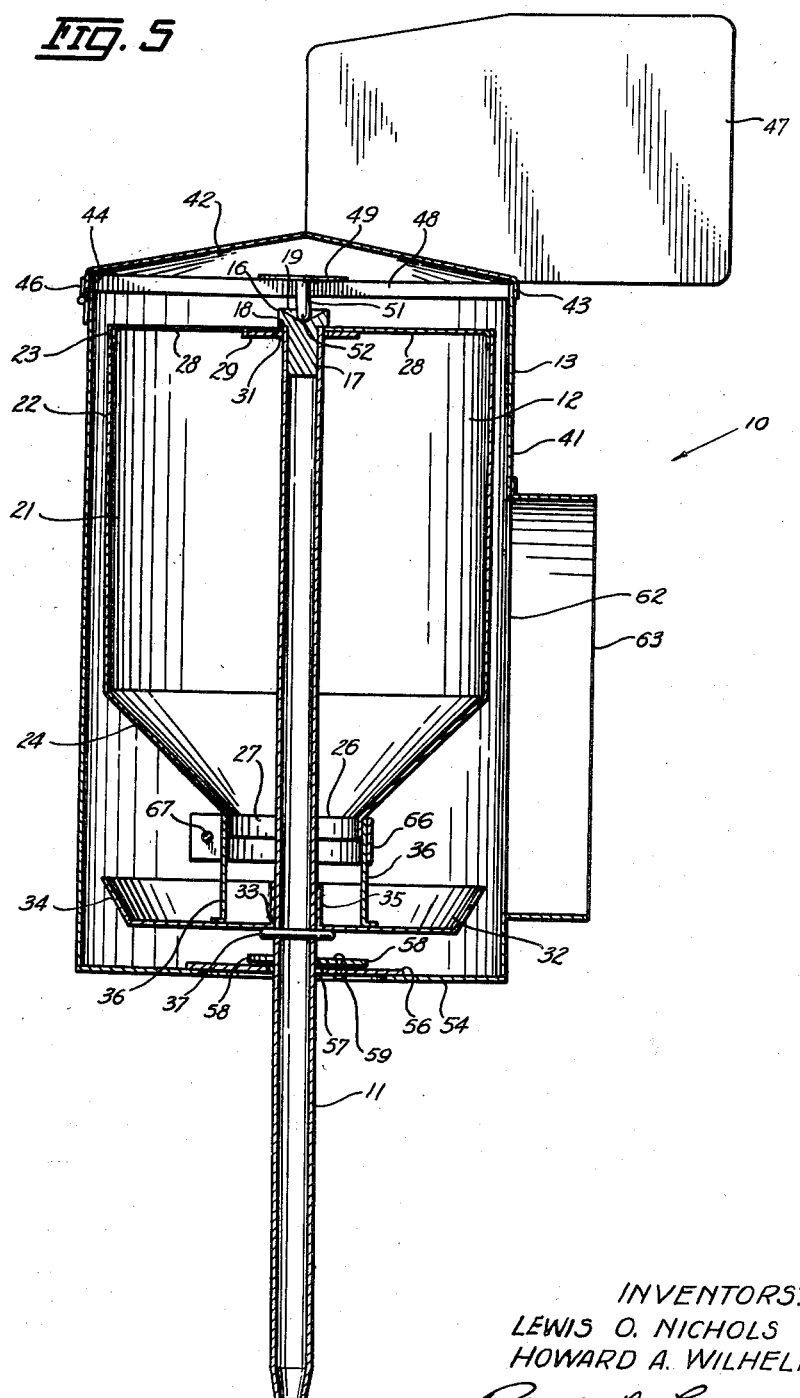

United States Patent Office 2,841,116
Patented July 1, 1958

2,841,116

FEEDING DEVICE

Lewis O. Nichols and Howard A. Wilhelm,
Webster City, Iowa

Application March 8, 1955, Serial No. 492,881

3 Claims. (Cl. 119—53)

This invention relates generally to animal feeders and more particularly to a livestock and poultry feeder.

An object of this invention, therefore, is to provide an improved livestock and poultry feeder.

A further object of this invention is to provide a hog feeder which is constructed so that a desired predetermined amount of feed is continuously accessible to the hogs feeding therefrom.

Another object of this invention is to provide a hog feeder which is constructed so that the feed contained therein is protected from the wind and rain at all times.

A further object of this invention is to provide a hog feeder having a feed pan and a housing positioned about and rotatable relative to the feed pan, with the housing having a feeding stall and a wind vane which are relatively arranged such that the stall is always positioned substantially perpendicular to the direction of the wind.

Still another object of this invention is to provide a hog feeder which includes an upright feed container or hopper from which the feed flows at a controlled rate to a feeding pan so that the feeder requires filling only at infrequent intervals.

A further object of this invention is to provide a hog feeder which is readily assembled and which includes a hinged cover for facilitating the filling of the feeder with feed.

Yet a further object of this invention is to provide a hog feeder which is simple in construction, economical in cost, and efficient in operation to provide a predetermined amount of feed in a feeding pan which is continuously protected from the wind and rain.

Further objects, features and advantages of this invention will become apparent from a consideration of the following description, when taken in connection with the accompanying drawing in which:

Fig. 2 is a reduced exploded perspective view of the feeder of this invention;

Fig. 3 is a fragmentary plan view of the structure located at the bottom end of the feed housing for rotatably supporting the housing;

Fig. 4 is a top plan view of the feed regulating sleeve used in the feeder of this invention; and Fig. 5 is a vertical sectional view of the feeder of this invention, as seen along the line 5—5 in Fig. 1.

Figure 1:
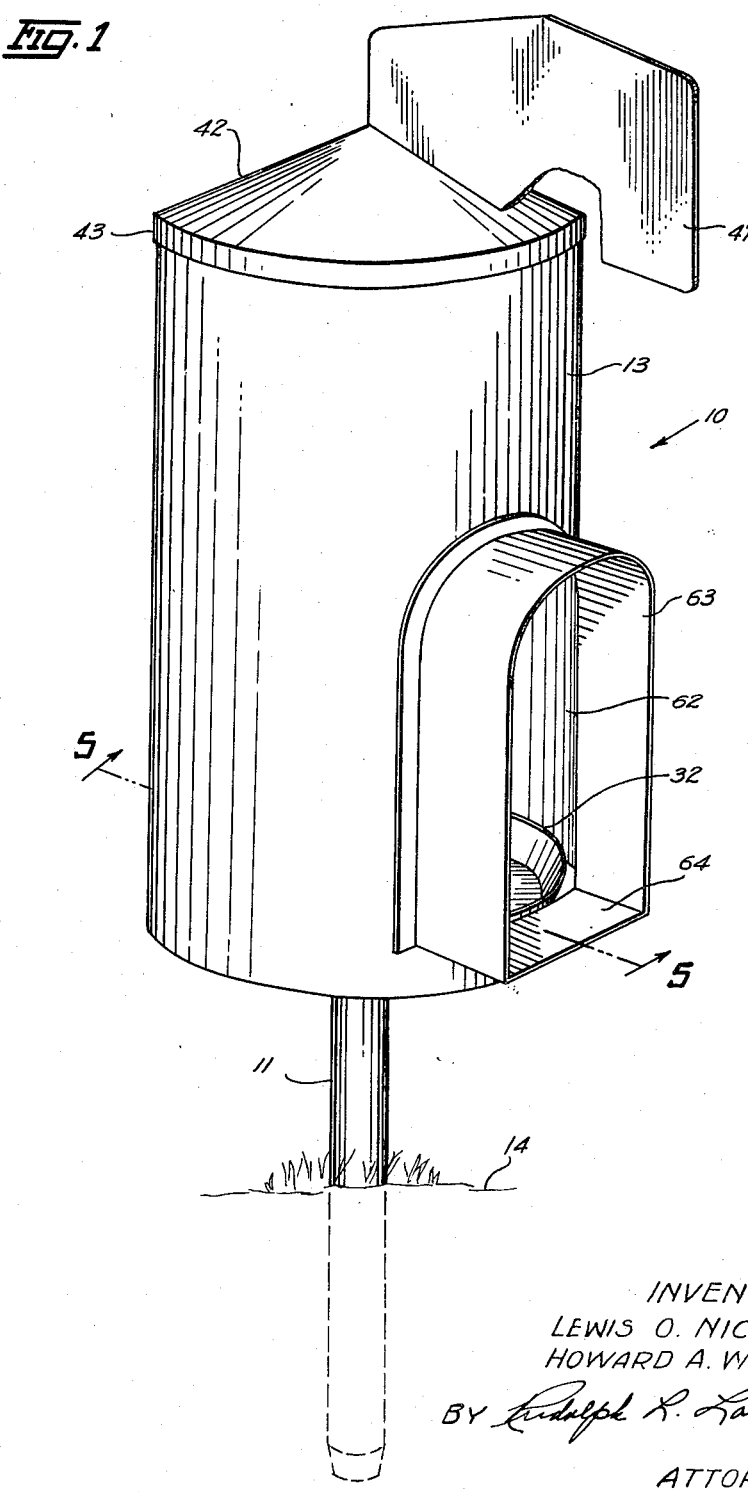
Fig. 1 is a perspective view of the hog feeder of this invention, with a portion of the wind vane for the feeder broken away to better illustrate the construction of the feeder.

With reference to the drawing, the hog feeder of this invention, indicated generally at 10, is illustrated in Figs. 1 and 5 as including an upright tubular support or standard 11, a feed dispensing unit 12 supported on and extended axially of the support 11, and a tubular housing or casing 13 rotatably supported on the support 11 and extended about the unit 12. The tubular support 11 is driven into the ground, indicated at 14 in Fig. 1, so that the support 11 is self-supported in an upright position. A solid plug 16 (Fig. 5) has a reduced portion 17 received in a press fit within the upper end of the tubular support 11, with a shoulder 18 on the plug 16 being against the upper end of the support 11. At its top end, the plug 16 is formed with a conical cavity 19.

The dispensing unit 12 includes a feed hopper or container 21 having an upright tubular portion 22 provided with an open upper end 23. The hopper 21 has a frustoconical lower portion 24 provided with a lower open end 26 which terminates in a downwardly extended annular flange 27, with the lower open end 26 of the portion 24 constituting the outlet for the hopper 21.

Secured to and extended across the open upper end 23 of the hopper 21, are four straps 28 (Figs. 2 and 5) which carry an annular plate 29 having a central opening 31 and arranged about the support 11 at a position against the shoulder 18 on the plug 16.

An annular pan member 32, of a diameter corresponding substantially to the diameter of the hopper portion 22 (Fig. 5), is arranged below and in co-axial relation with the hopper 21. The pan 32 is provided with a central opening 33, defined by an upright flange 35, which receives the tubular support 11, and has an upturned peripheral flange portion 34. A series of vertical straps 36, illustrated as four in number (Figs. 2 and 5), are secured to and extended between the hopper flange 27 and the pan 32, at a position between the central opening 33 and the pan portion 34. A pin 37, extended transversely through the support 11 at a position below the pan 32, engages the under side of the pan 32 and prevents any downward movement of the dispensing unit 12 on the support 11.

The housing 13 (Figs. 1, 2 and 5) includes an upright tubular body portion 41, of a diameter substantially greater than that of the hopper portion 21 and of a length to extend above and below the dispensing unit 12. A cone shape cover member 42 (Figs. 2 and 5), having a downturned peripheral flange 43 positioned about the open upper end 44 of the body portion 41, closes the upper end of the body portion 41. A hinge 46, secured to the flange 43 and the body portion 41 connects the cover 42 to the body portion 41 and provides for movement of the cover 42 to a position to one side of the dispensing unit 12 during filling of the hopper 21. An upright vane member 47 is secured to and extended upwardly and outwardly from the cover 42.

At its upper end 44, the body portion 41 is provided with four radially inwardly extended straps 48 which carry a central disc 49 to which is secured a downwardly extended pin 51 having a rounded lower end 52 engaged with the plug 17 at a position within the cavity 19. It is seen, therefore, that by virtue of the support of the pin 51 on the plug 16, the housing 13 is readily rotatable about the support 11. For stabilizing such rotating movement of the housing 13, the lower end of the housing body portion 41 is provided with four inwardly extended straps 54 (Figs. 3 and 5) which carry a plate 56 arranged about the support 11 and having a central opening 57 of a diameter greater than the diameter of the support 11.

A series of flat disc shape bearing members 58, illustrated in Fig. 3 as being three in number, are secured to the top side of the plate 56 by bolt and sleeve assemblies 59 so as to be freely rotatable on the plate 56. The discs 58 are spaced apart and arranged on the plate 56 so that the peripheral surfaces 61 of the discs are engaged with the support 11.

Intermediate its ends, the housing body portion 41 is provided with an elongated upright opening 62 (Figs. 1 and 2) surrounded by a stall member 63 which is secured to the housing 13 and extends outwardly therefrom at a position in substantial vertical alignment with the vane 47. The opening 62 and the stall member 63 constitute a feeding stall 64 for a hog feeding from the feeder 10.

In use, the feeder 10 is adapted to contain a mineral supplement type of feed which is of a powdery granular consistency. The cover 42 is swung about the hinge 46 to a position to one side of the housing 13, and the hopper 21 is filled with the feed. Some of such feed travels downwardly through the hopper outlet 26 (Fig. 5) to the pan 32. This feed piles up on the portion of the pan 32 below the hopper outlet 26 and between the upright straps 36. Some of the feed thus piled on the pan 32 flows outwardly between the straps 36 toward the upturned pan portion 34, where it is accessible to a hog feeding at the stall 64. The amount of such feed moved outwardly in the pan 32 is regulated by adjustment of a sleeve 66 (Figs. 4 and 5) extended about and movable up and down on the straps 36. As best appears in Fig. 4, the sleeve 66 is of a split expandible construction and may be held in an adjusted position on the straps 36 on tightening of a bolt 67 which connects the ends of the sleeve 66.

It can thus be seen that a maximum amount of feed is continuously available for feeding when the sleeve 66 is in the adjusted position shown in Fig. 5, namely, against the lower end of the hopper 21 and about the flange 27. The flow of feed is decreased merely by moving the sleeve 66 downwardly on the straps 36, and, if desired, a second sleeve 66 may be arranged on the straps 36 below the sleeve 66 illustrated in Fig. 5 to further decrease the flow.

By virtue of the wind vane 47 on the housing 13 and the rotatable mounting of the housing 13 on the support 11, the housing 13 is rotated about the support 11 and the feed dispensing unit 12 in response to a change in wind direction. Since the feeding stall 64 is vertically aligned with the wind vane 47, the feeding stall 64 is maintained at a position perpendicular to the wind direction. The feed within the pan member 32 is thus continually shielded from the wind by the housing 13. It is also apparent that the housing 13 operates to keep the feed in the pan 32 dry at all times.

From the above description, it is seen that this invention provides a hog feeder 10 which automatically maintains a controllable amount of feed continuously available to the hogs to be fed by the feeder 10.

The wind vane 47 and the rotatable support of the housing 13 on the support 11 cooperate to prevent any of the feed in the pan 32 from being blown about the hog yard by the wind, since the stall 64 is perpendicular to the wind at all times. The needle point support of the housing 13 on the upper end of the support 11 and the engagement of the discs 58 with a lower portion of the support 11 provide for the housing 13 being readily rotatable about the support 11 in response to a slight wind change while also providing for a firm support of the housing 13. Also, the rotatable support of the housing 13 and the outwardly projecting stall member 63, along with the arrangement of the feeder 10 above the ground surface cooperate to preclude a hog from getting his feet into the feed in the pan 32.

Although the feeder 10 has been described particularly with respect to a hog feeder it is to be understood that it is equally adaptable to the feeding of livestock and poultry generally.

Also, although the invention has been described with respect to a preferred embodiment thereof, it is to be understood that it is not to be so limited, since changes can be made therein which are within the full intended scope of this invention as defined by the appended claims.

We claim:

1. An animal feeding device comprising an upright cylindrical support member, a feed container and pan unit mounted on said support member intermediate the ends thereof, a tubular housing arranged about said unit and having a feeding opening therein at a position opposite said unit, means on said housing engaged with the upper end of said support member, an annular plate carried by said housing and arranged about said support in a clearance relation therewith at a position below said unit, disc shape bearing members rotatably supported on said plate for bearing engagement with said support member to provide for rotation of said housing on said support and about said unit, and a wind vane member carried by said housing.

2. A feeding device comprising an upright cylindrical support member having a conical depression formed in the top thereof, a feed container and pan unit mounted on said support member intermediate the ends thereof, a tubular housing arranged about said unit and having a feeding opening therein at a position opposite said unit, a depending element supported centrally of said housing and engaged within said conical depression, means carried by said housing rotatably engaged with said support member below said pan unit, and a wind vane member carried by said housing.

3. In a feeding device having an upright cylindrical support member with a conical depression formed in the top thereof, a feed container and pan unit mounted on said support member intermediate the ends thereof, and with means for regulating the flow of feed from the container to the pan, a tubular housing unit comprising a tubular body portion having a length greater than the length of said container and pan unit, said body portion forming an opening at one end and being partially closed at the other end, feeding stall means formed in one side of said portion, a depending element supported across the open end and along the axis of said portion and adapted to rest upon and within the support member depression, an annular plate secured to said body portion and arranged about said support member in a clearance relation therewith at a position below said unit, disc shape bearing members rotatably supported on said plate for bearing engagement with said support member, a cover member removably mounted on the body portion over the open end thereof, and a wind vane member carried by said cover member.

References Cited in the file of this patent
UNITED STATES PATENTS

| | | |
|---|---|---|
| 1,148,301 | Enos | July 27, 1915 |
| 1,485,469 | Riegel | Mar. 4, 1924 |
| 2,566,446 | Gomer | Sept. 4, 1951 |
| 2,707,454 | Wilkinson | May 3, 1955 |